United States Patent

Mas

[15] 3,683,257
[45] Aug. 8, 1972

[54] APPARATUS FOR CHARGING BATTERIES

[72] Inventor: Joseph A. Mas, 3 Maple Way, Woodbury, N.Y. 11797

[22] Filed: Oct. 23, 1970

[21] Appl. No.: 83,469

[52] U.S. Cl. .................................... 320/31, 320/46
[51] Int. Cl. ............................................. H02j 7/10
[58] Field of Search .......... 320/14, 32, 39, 40, 46, 22, 320/23, 31; 323/22 SC, 23

[56] References Cited

UNITED STATES PATENTS

| 3,281,640 | 10/1966 | Mas | 320/46 |
| 3,382,425 | 5/1968 | Legatti | 320/32 |
| 3,497,791 | 2/1970 | Moore | 323/22 SC X |

Primary Examiner—J. D. Miller
Assistant Examiner—Robert J. Hickey
Attorney—Gottlieb, Rackman and Reisman

[57] ABSTRACT

Apparatus for charging a battery under acceptance current control. Two SCR's are included in a bridge circuit for supplying charging current to the battery during alternate half cycles. A transistor, connected in a feedback configuration to the gates of the SCR's, diverts gate current from the SCR's to delay the firing angle in the event the charging current exceeds the maximum safe value. A single element, a gassing rate sensor contained in the battery case, is coupled to the transistor and is the only additional element required to produce acceptance current control of the charging current.

6 Claims, 1 Drawing Figure

PATENTED AUG 8 1972
3,683,257
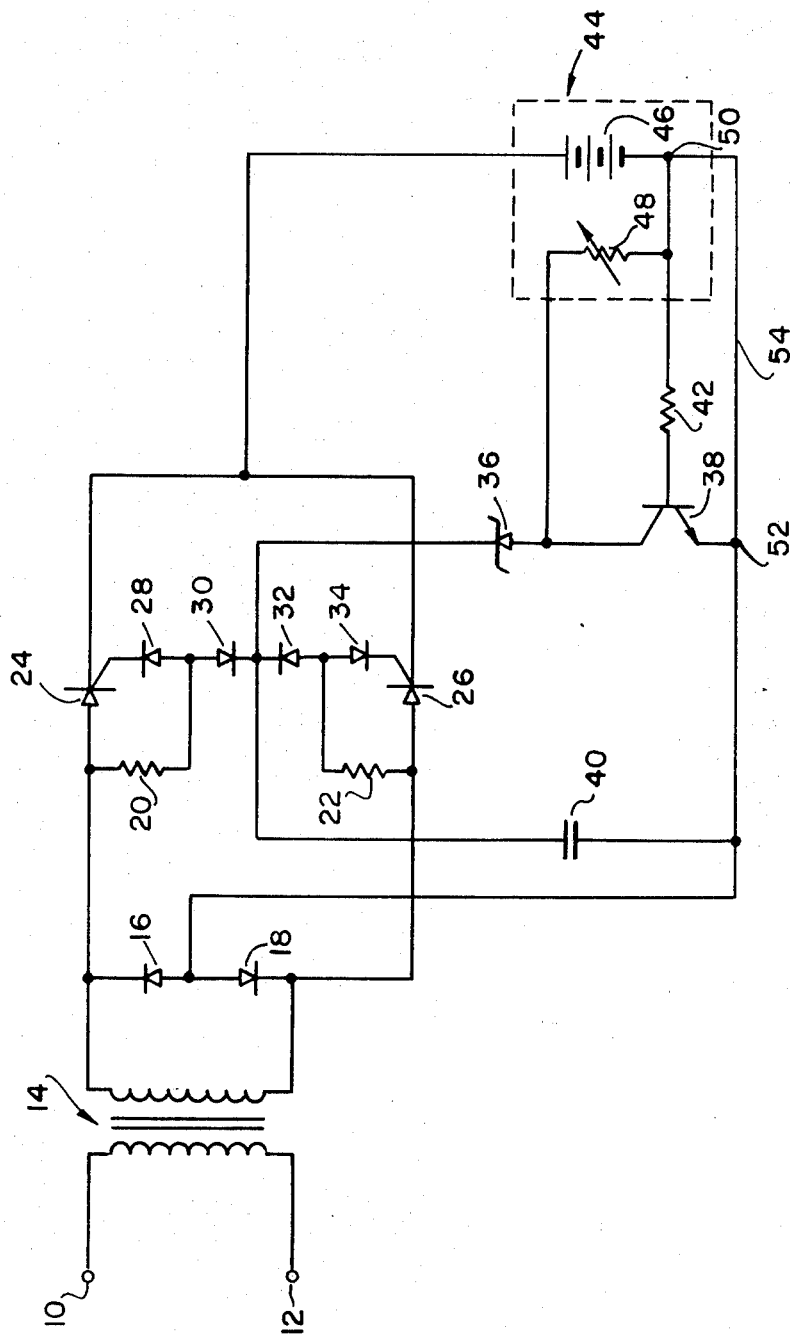
INVENTOR.
JOSEPH A. MAS
BY Amster & Rothstein
ATTORNEYS

APPARATUS FOR CHARGING BATTERIES

This invention relates to apparatus for charging batteries, and more particularly to an economical, high current battery charger.

The concept of battery "acceptance" is described in the SAE (Society of Automotive Engineers) Journal, June 1969, vol. 77, No. 6, pp. 31–33. The acceptance of a battery is a measure of its ability to accept and store a charge. If a charging current is supplied to a battery which is greater than the acceptance current, the excess current will not be stored but will instead result in the gassing of the electrolyte in accordance with Faraday's Laws. The acceptance current decreases exponentially as charging progresses. Therefore, to rapidly charge a battery without producing gassing, the charging current should decrease exponentially as a function of time and should follow the acceptance current curve.

In the system described in my above-identified article, a pressure transducer is provided to sense the gas evolution developed in the battery. The battery is vented so that any gas produced escapes to the atmosphere, although relatively slowly. In this manner, the pressure inside the battery is a measure of the degree to which the gassing rate exceeds a predetermined level (i.e., the degree to which the charging current exceeds the acceptance current). The signal developed by the transducer is used to control the charging current so that it follows the acceptance current curve. By providing a feedback system, the gassing can be kept so low as to have almost no deleterious effect on the battery, while at the same time the charging current can be made to follow the acceptance current curve for rapid charging. With the use of such a system, it is possible to charge an automobile battery to 80 percent of its full charge in less than half an hour.

In my copending application, Ser. No. 35,352, filed on May 7, 1970, I disclose a method and apparatus for charging batteries at rates which are significantly faster. The technique of the invention disclosed in my copending application is to discharge the battery periodically during the charging process. The periodic (high rate, short duration) discharge of a battery during the charging process, under acceptance current control, allows the battery to be charged at a very rapid rate.

The discharge pulses, although short, are of very large magnitude and high current capacity elements must be utilized in the circuit. There are many situations in which the very rapid charging of a battery by periodically discharging it under acceptance current control does not justify the increased cost of the discharge pulsing equipment. For example, electrically driven golf carts, while they can be charged in a matter of minutes in accordance with principles of my aforesaid invention, typically need not be charged so rapidly; often, a time period in the order of one hour may be allowable for the charging. It is apparent that in such a case there is no need for the periodic discharging of the battery during the charging process.

Instead, exponential charging (following the acceptance current curve) as described in my above-identified SAE article is adequate — the charging is relatively fast and yet there is no need for the additional expense of pulse discharge circuitry. At the same time that the charging current is made to follow or "track" the acceptance current curve in order that the battery be charged as quickly as possible, it is also necessary to insure that the maximum charging current delivered to the battery, even though it may be below the acceptance current level, does not exceed the maximum rating of the semiconductor devices in the battery charger which delivers it. For example, the semiconductor devices in the battery charger may be rated at 300 amperes. Were the feedback circuit which controls the charging current in accordance with the instantaneous value of the acceptance current to cause a 500-ampere current to flow, the semiconductor elements in the charging apparatus could be destroyed.

It is a general object of my invention to provide a highly economical apparatus for charging a battery under acceptance current control in which the maximum current delivered by the apparatus cannot exceed a pre-designed maximum value.

Briefly, in accordance with the principles of my invention, I provide a bridge circuit for rectifying the line current. The bridge delivers a full-wave rectified current to the battery. Two SCR's (silicon controlled rectifiers) are included in two arms of the bridge. The firing angles of the SCR's (each SCR fires on alternate half cycles) are determined by the rate of gas generation sensed in the battery case. The greater the rate, the smaller the firing angle (the less the conduction through each SCR). The signal developed by the sensor determines the signal at a control point, which in turn determines the firing angle in each half cycle. A control transistor is provided which also affects the signal at the control point. The transistor is connected in a feedback configuration such that the charging current is limited to a maximum value independent of the sensor signal. Thus a single control circuit not only causes the charging current to follow the acceptance current curve but also limits the charging current to the maximum safe value. The entire apparatus consists of little more than a full-wave rectifier which includes two SCR's, a gas rate sensor and a control circuit of minimum complexity.

It is a feature of my invention to supply charging current to a battery through semiconductor switches whose conduction is determined by a single control circuit, the single control circuit functioning to develop a control signal component in accordance with acceptance current of the battery and a feedback component designed to limit the current to a maximum value so that the ratings of the semiconductor switches are not exceeded.

Further objects, features and advantages of my invention will become apparent upon consideration of the following detailed description in conjunction with the drawing which depicts the illustrative embodiment of my invention.

Terminals 10, 12 are connected across a power line. Transformer 14 develops an AC signal of the proper magnitude across its secondary winding. Typically, the voltage amplitude will be reduced inasmuch as the primary object of the circuit is to deliver a large current to battery 46 (as the secondary voltage decreases, it is capable of delivering a larger current). Diodes 16, 18 and SCR's 24, 26 comprise a full-wave rectifier. When the upper terminal of the secondary winding of transformer 14 is positive, current flows through SCR 24, battery 46, and diode 18 back to the lower end of the transformer winding. Similarly, when the lower end of the transformer secondary is positive, current flows through SCR 26, battery 46 and diode 16 back to the upper end of the winding. The amount of the current delivered to battery 46 depends upon that point during each half cycle when one of SCR's 24 and 26 fires. The later in each cycle that an SCR fires (the larger the firing angle), the less the current which flows through it.

In the absence of conduction through the collector-emitter circuit of transistor 38 and Zener diode 36, each SCR conducts for almost a full half cycle. The positive voltage at the anode of SCR 24, for example, is extended through resistor 20 and diode 28 to the gate terminal of the SCR. Resistor 20 is of relatively small magnitude and thus supplies a sufficient gate current to SCR 24 to turn the SCR on soon after the anode voltage goes positive. There is thus almost full conduction through SCR 24. Resistor 22 and diode 34 serve a similar function for SCR 26. In both cases, whenever the voltage across the secondary winding of transformer 14 is only slightly greater than the potential of battery 46, one of the SCR's turns on.

Diodes 28 and 34 serve primarily to prevent gate leakage current from flowing. For example, when SCR 26 conducts and SCR 24 is off, diode 28 prevents current from flowing from battery 46 through the cathode-gate junction of SCR 24.

Battery 46 is contained in case 44 together with sensor 48, which in the illustrative embodiment of the invention is a pressure transducer. As the pressure inside the vented battery case increases with gas evolution, the impedance of resistor 48 decreases. The cathode of battery 46 is connected through resistor 42 to the base of transistor 38. Transducer 48 is connected between the collector of transistor 38 and resistor 42. It is the potential at the collector of transistor 38 which controls the firing angle of the SCR's. The lower the potential, the greater the current which is diverted from the gate of that SCR which would ordinarily conduct. For example, if the upper end of the secondary winding of transformer 14 is positive, in the absense of conduction through transistor 38 and transducer 48, maximum current would flow through resistor 20 and diode 28 to the gate of the SCR to turn it on. However, with transistor 38 or transducer 48 conducting current, current flows through diode 30 and Zener diode 36 and is thus shunted away from the gate of SCR 24 and the SCR turns on later in each cycle. In a similar manner, diode 32 conducts some of the gate current through resistor 22 and shunts it away from the gate of SCR 26 to delay the firing of SCR 26 in alternate half cycles of the line voltage. The greater the conduction through transistor 38 or transducer 48 the greater the current which is shunted away from the gate of the SCR which would otherwise conduct.

Zener diode 36 does not affect the control of the SCR's. It is included in the circuit merely to reduce the power dissipation in transducer 48 and transistor 38. The Zener diode reduces the collector voltage of the transistor by an amount equal to the drop across it.

Transistor 38 determines the maximum current which can flow in the system. The transistor may be a small milli-watt unit (even though currents in the hundreds of amperes are controlled). The base-emitter potential drop of transistor 38 is determined by the voltage drop from point 50 in the circuit to point 52. The connection (conducter 54) between these points is typically one of the output cables which connects the battery charger to the battery. The cable is of predetermined length and thickness and therefore has a predetermined resistance. The cable is selected such that at the maximum desired current the drop across it is approximately 0.5 volts. Conventional cables have been found to be adequate for this purpose. The use of such a cable eliminates the need for a lumped resistance within the charger and additional dissipation inside the apparatus. This additional dissipation, in the case of a 300-ampere charging current, would be 300 × 0.5 or 150 watts.

Suppose that for some reason the charging current attempts to exceed the 300-ampere maximum limit. (The charging current itself consists of a rectified waveform, and the 0.5-volt drop between point 50 and point 52 refers to the average value.) In such a case, transistor 38 would conduct more heavily and more current would be diverted from the gate of the SCR which conducts during each half cycle. This, in turn, delays the firing of the SCR and results in a reduction of the charging current. Transistor 38, connected in a feedback configuration, thus serves to limit the charging current to a maximum value of 300 amperes so that the rating of each of SCR's 24 and 26 is not exceeded.

The potential difference between point 50 and point 52 is actually a full-wave rectified signal inasmuch as the charging current itself is of this nature. However, transistor 38 and Zener diode 36 do not turn on and off continuously. Capacitor 40 is connected across the Zener diode and the transistor — the capacitor being connected between the cathode of the Zener diode and the emitter of the transistor. The capacitor smooths the voltage at the junction of diodes 30 and 32 so that Zener diode 36 and transistor 38 do not turn on and off continuously.

As long as there is no gassing inside battery case 44, the average value of the charging current is thus held to 300 amperes. In many cases, the 300-ampere level will be less than the initial acceptance current of the battery. The charging proceeds at a 300-ampere rate until the acceptance current falls below this value. It is only at this time that the gassing commences and transducer 48 causes the charging current to decrease.

When the impedance of transducer 48 decreases, an alternate current path is provided — current through Zener diode 36 flows not only through transistor 38 but also through transducer 48. Thus even more gate current is diverted from the SCR's and the firing angle is delayed in each half cycle. As the battery becomes increasingly charged, the firing angle continuously decreases (the gassing rate is maintained at a level so low as to have no deleterious effect on the battery), and the less the conduction through the SCR's. It is after gassing starts that transducer 48 in effect takes control of the charging process.

The transistor control of the maximum current is very important for the following practical reason. The line voltage may vary by as much as 20 volts. The battery voltage necessarily varies as well depending upon the extent of its charge. It is apparent that in the case of a minimum battery charge and a maximum line voltage, a very large charging current could flow. It is important to limit the current to a maximum safe value under all conditions. This is accomplished under the control of feedback transistor 38. To the feedback circuit there must be added only a single element — transducer 48 — to achieve acceptance current control of the charging.

Although the invention has been described with reference to a particular embodiment, it is to be understood that this embodiment is merely illustrative of the application of the principles of the invention. For example, diodes 16 and 18 can be omitted if conductor 54 is connected to the center tap of the secondary winding of transformer 14. Also, a single SCR can be used to conduct current during both halves of each full cycle after full-wave rectification. Thus, it is to be understood that numerous modifications may be made in the illustrative embodiment of the invention and other arrangements may be devised without departing from the spirit and scope of the invention.

What I claim is:

1. A battery charger for charging a battery comprising a rectifier circuit including semiconductor switch means for supplying charging current to a vented battery, said semiconductor switch means having a control terminal and means for controlling the time interval in each cycle of operation of said rectifier circuit during which said semiconductor switch means supplies charging current to the battery, said controlling means including a semiconductor amplifier having input means and an output terminal, said output terminal being connected to said control terminal for allowing said semiconductor amplifier to divert current from said control terminal in accordance with a signal applied to said input means, feedback means responsive to the average charging current supplied to the battery for developing a signal at said input means to limit the average charging current to a maximum value, and variable impedance means responsive to the rate of gas evolution in the battery connected between said input means and said output terminal for diverting current from said control terminal to thereby control the average charging current supplied to the battery in accordance with the rate of gas evolution in the battery.

2. A battery charger in accordance with claim 1 wherein said semiconductor amplifier includes a transistor having collector, base and emitter terminals, said collector terminal being connected to said control terminal, said feedback means includes means connected to said base and emitter terminals for developing a voltage thereacross proportional to the charging current supplied to the battery, and said variable impedance means is connected between said collector and base terminals.

3. A battery charger in accordance with claim 2 wherein said variable impedance means is a pressure transducer and said voltage developing means is a cable for connecting the battery to said rectifier circuit and means for coupling said cable across said collector and base terminals.

4. A battery charger in accordance with claim 3 wherein said semiconductor switch means includes at least one silicon controlled rectifier and said control terminal is the gate terminal thereof.

5. A battery charger in accordance with claim 1 wherein said variable impedance means is a pressure transducer, and said voltage developing means is a cable for connecting the battery to said rectifier circuit and means for coupling said cable across said collector and base terminals.

6. A battery charger in accordance with claim 1 wherein said semiconductor switch means includes at least one silicon controlled rectifier and said control terminal is the gate terminal thereof.

* * * * *